United States Patent
Underwood et al.

(10) Patent No.: US 11,519,332 B1
(45) Date of Patent: Dec. 6, 2022

(54) FUEL INJECTOR WITH INTEGRATED HEAT EXCHANGER FOR USE IN GAS TURBINE ENGINES

(71) Applicant: Rolls-Royce North American Technologies Inc., Indianapolis, IN (US)

(72) Inventors: David S. Underwood, San Jose, CA (US); Geoffrey O. Campbell, Broomfield, CO (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 17/317,415

(22) Filed: May 11, 2021

(51) Int. Cl.
  *F02C 7/224* (2006.01)
  *F23R 3/28* (2006.01)

(52) U.S. Cl.
  CPC .............. *F02C 7/224* (2013.01); *F23R 3/283* (2013.01); *F05D 2220/32* (2013.01); *F05D 2240/35* (2013.01)

(58) Field of Classification Search
  CPC ...... F02C 7/224; F23R 3/283; F05D 2220/32; F05D 2240/35
  See application file for complete search history.

(56) References Cited

U.S. PATENT DOCUMENTS

| | | |
|---|---|---|
| 3,535,875 A | 10/1970 | Sneeden et al. |
| 5,351,477 A | 10/1994 | Joshi et al. |
| 6,076,356 A | 6/2000 | Pelletier |
| 6,595,000 B2 | 7/2003 | Lavie et al. |
| 6,763,663 B2 * | 7/2004 | Mansour ............ F23R 3/286 60/39.83 |
| 7,827,795 B2 | 1/2010 | Hicks et al. |
| 7,832,377 B2 | 11/2010 | Lee et al. |
| 8,042,339 B2 | 10/2011 | Lacy et al. |
| 8,342,425 B2 | 1/2013 | Imoehl |
| 8,479,518 B1 | 7/2013 | Chen |
| 8,820,047 B2 | 9/2014 | Saito et al. |
| 9,638,422 B2 | 5/2017 | Hall et al. |
| 9,932,940 B2 | 4/2018 | Lo |
| 10,184,663 B2 | 1/2019 | Frish |
| 10,400,672 B2 | 9/2019 | Frish et al. |
| 10,458,331 B2 | 10/2019 | Xu |
| 10,739,005 B2 | 8/2020 | Kironn et al. |
| 10,775,046 B2 | 9/2020 | Snyder et al. |
| 10,830,147 B2 | 11/2020 | Snyder et al. |
| 10,830,150 B2 | 11/2020 | Snyder et al. |
| 2004/0040306 A1 | 3/2004 | Prociw et al. |
| 2007/0039326 A1 | 2/2007 | Sprouse et al. |
| 2011/0005232 A1 | 1/2011 | Williams et al. |

(Continued)

FOREIGN PATENT DOCUMENTS

| | | |
|---|---|---|
| CN | 104110309 | 10/2014 |
| EP | 3406885 | 11/2018 |
| GB | 2476253 | 6/2011 |

Primary Examiner — Gerald L Sung
Assistant Examiner — Rene D Ford
(74) Attorney, Agent, or Firm — Barnes & Thornburg LLP

(57) ABSTRACT

Fuel injectors having a fuel-air heat exchange system and methods thereof for use in a gas turbine engine. The fuel-air heat exchanger allows heat transfer between a flow of cooling air used to cool components of the engine and a flow of fuel used to drive the engine to transfer heat to the flow of fuel and cool the cooling air.

20 Claims, 7 Drawing Sheets

(56) References Cited

U.S. PATENT DOCUMENTS

| | | | |
|---|---|---|---|
| 2011/0302928 A1 | 12/2011 | Mudawar | |
| 2013/0219915 A1 | 8/2013 | Prociw et al. | |
| 2014/0060057 A1 | 3/2014 | John et al. | |
| 2015/0000291 A1 | 1/2015 | Smith et al. | |
| 2016/0025009 A1* | 1/2016 | Morenko | F02C 7/14 |
| | | | 60/785 |
| 2016/0138873 A1 | 5/2016 | Dyer | |
| 2017/0254269 A1* | 9/2017 | Snyder | F02C 7/224 |
| 2018/0266691 A1 | 9/2018 | Sweeney et al. | |
| 2020/0217510 A1* | 7/2020 | Sampath | F23R 3/286 |
| 2021/0156310 A1* | 5/2021 | Prociw | F02C 7/224 |

* cited by examiner

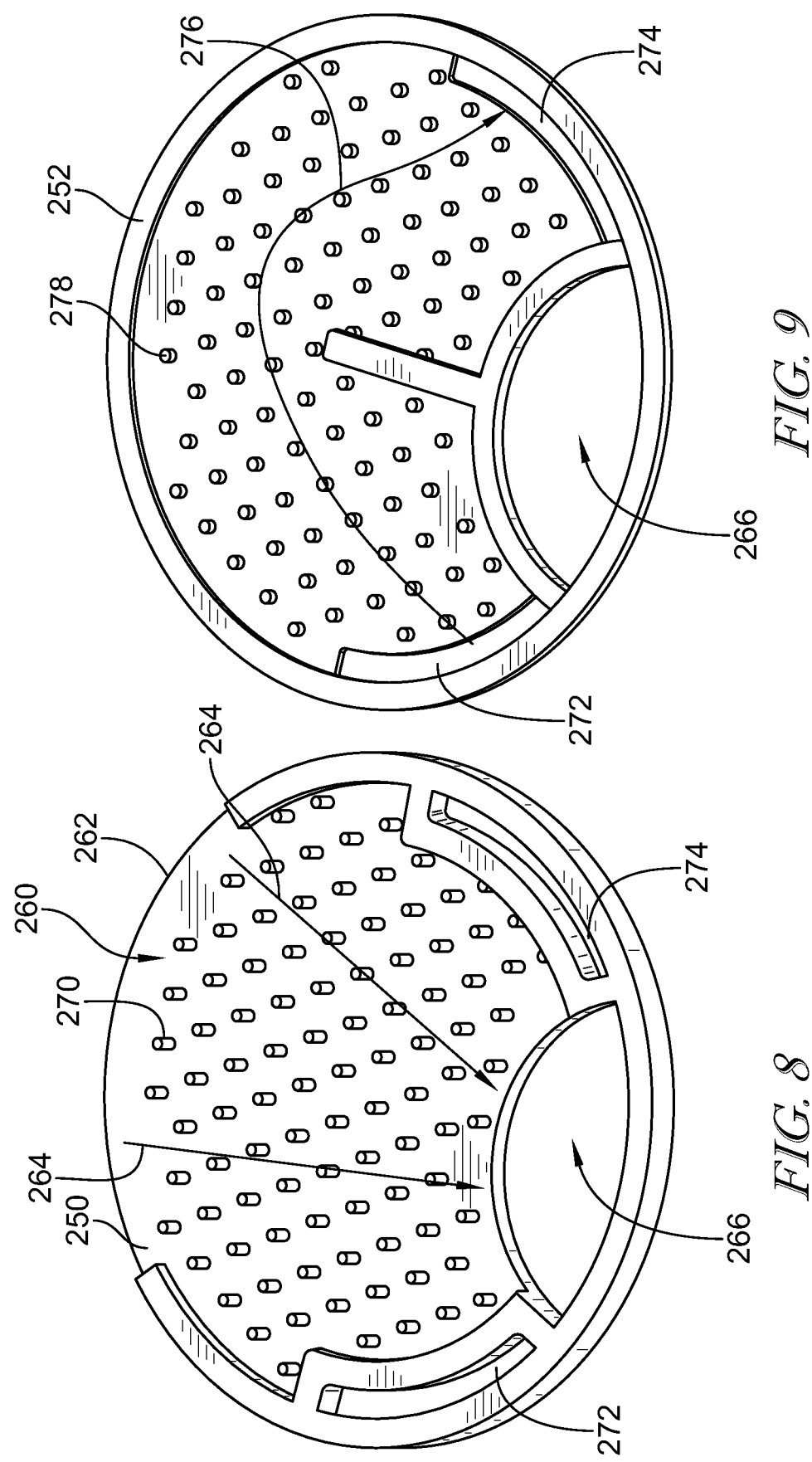

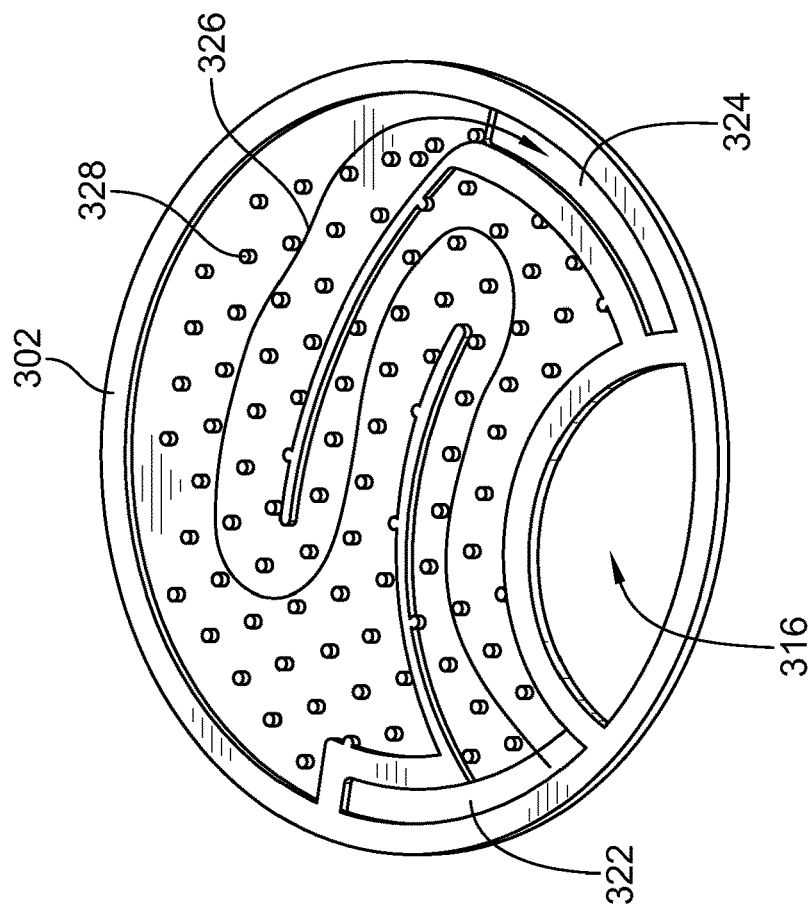
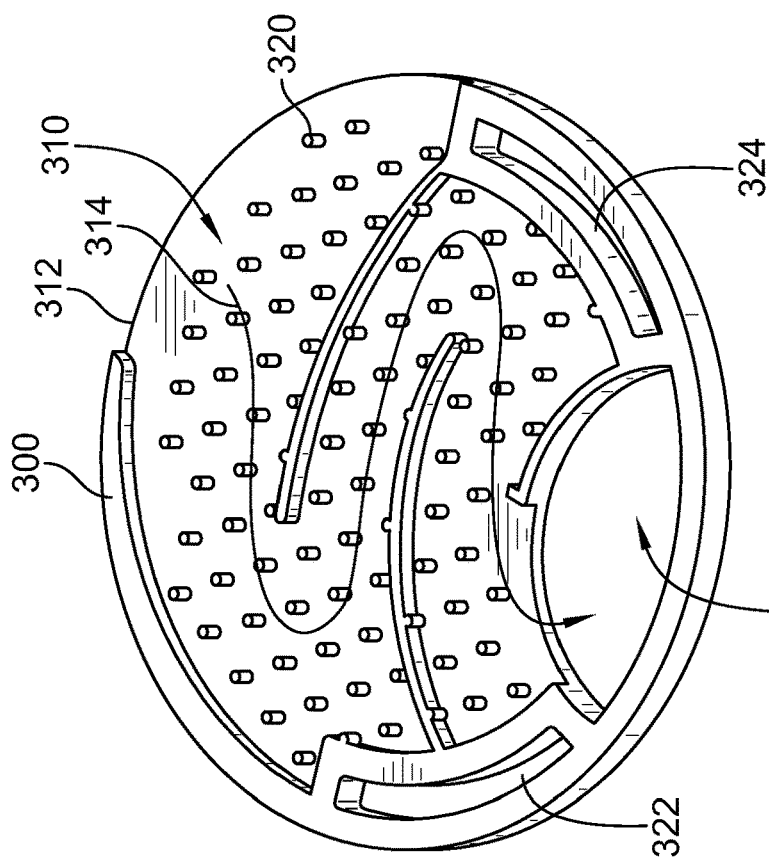

FUEL INJECTOR WITH INTEGRATED HEAT EXCHANGER FOR USE IN GAS TURBINE ENGINES

GOVERNMENT RIGHTS

The present application was made with the United States government support under NASA Contract No. NNX17CC05C, awarded by the United States government. The United States government may have certain rights in the present application.

FIELD OF THE DISCLOSURE

The present disclosure relates generally to gas turbine engines, and more specifically to cooling air systems of a gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, fuel is mixed with the high-pressure air and is ignited. Products of the combustion reaction in the combustor are directed into the turbine where work is extracted to drive the compressor and, sometimes, an output shaft.

Components in the turbine may be exposed to high temperatures from products of the combustion reaction in the combustor. Cooling of these components can present design challenges. Efficient coordination and/or use of heat can improve performance of the gas turbine engine.

Modern high efficiency gas turbine engines typically operate with hot section temperatures so high that metal parts in those areas need to be cooled to maintain strength and life properties. A portion of the compressor discharge air may be bled off and used to flow through and over turbine parts to cool the parts. As engine compressor pressure ratios continue to increase, the temperature of this compressor discharge air also increases, to the point that the cooling air itself may need to be cooled. Some engine manufacturers utilize thermal management architectures that may use either fan air or combustor fuel as the heat sink for cooled cooling air. One benefit of using fuel as the heat sink may be that the heat removed from the cooling air is transferred to the fuel and retained in the cycle, benefiting specific fuel consumption.

Recent approaches to developing fuel-cooled cooling air technology involve routing fuel and bleed air to and from a heat exchanger on the outside of the engine. Such an approach may use a large volume of heated fuel flowing through tubes external to the engine combustor case. Additionally, once the cooling air is cooled, a route back through the engine case and across the gas path is used to deliver the cool air to the secondary air circuits inboard of that gas path.

SUMMARY

The present application discloses one or more of the features recited in the appended claims and/or the following features which, alone or in any combination, may comprise patentable subject matter.

According to a first aspect of the present disclosure, a fuel injector includes a nozzle configured to discharge a fuel axially relative to an axis of the gas turbine engine into a combustion chamber included in the gas turbine engine. A stem extends radially away from the nozzle and is configured to conduct the fuel to the nozzle along a radially inward direction. A fuel-air heat exchanger is integral with the stem. The fuel-air heat exchanger includes a fuel foil having a fuel passageway coupled fluidically with the nozzle and extending along a first plane that is substantially perpendicular to the radially inward direction. An air foil is positioned adjacent to the fuel foil along the radially inward direction. The air foil has a cooling air passageway that extends along a second plane that is substantially perpendicular to the radially inward direction to direct air adjacent to the fuel flowing through the fuel passageway such that heat is transferred from the air flowing through the cooling air passageway to the fuel flowing through the fuel passageway when the fuel injector is used in the gas turbine engine to form cooled air that is directed away from the combustion chamber to provide cooling air.

In some embodiments of the first aspect, the fuel passageway may include a serpentine fuel passageway that extends along the first plane. The cooling air passageway may include a serpentine cooling air passageway that extends along the second plane. The first plane may extend substantially parallel to the second plane.

In some embodiments of the first aspect, the air foil may include a pair of air foils. A first of the pair of air foils may be positioned radially inward of the fuel foil. A second of the pair of air foils may be positioned radially outward of the fuel foil.

In some embodiments of the first aspect, a plurality of fuel foils may be provided. A plurality of air foils may be provided. Each of the plurality of fuel foils may be positioned adjacent to one of the plurality of air foils. The stem may include a fuel inlet manifold for receiving the fuel. A fuel outlet manifold may be provided for conducting the fuel to the nozzle. The fuel passageway of each fuel foil may extend between and may be fluidically connected with the fuel inlet manifold and the fuel outlet manifold. The fuel inlet manifold and the fuel outlet manifold may each extend in the radially inward direction through each of the plurality of fuel foils and each of the plurality of air foils. Each air foil may include an air opening for receiving the air. The stem may include an air outlet manifold for directing the air away from the combustion chamber to provide cooling air. The cooling air passageway of each air foil may extend between the respective air opening and the air outlet manifold. The air outlet manifold may extend in the radially inward direction through each of the plurality of fuel foils and each of the plurality of air foils.

In some embodiments of the first aspect, the fuel foil may include a plurality of first pins positioned in the fuel passageway such that the fuel moving through the fuel passageway flows over the plurality of first pins. The air foil may include a plurality of second pins positioned in the cooling air passageway such that the air moving through the cooling air passageway flows over the plurality of second pins.

According to a second aspect of the present disclosure, a combustor assembly for use in a gas turbine engine includes a combustor case. A combustion liner is mounted in the combustor case to define a combustion chamber. A plurality of fuel injectors are adapted to conduct fuel from a supply line arranged outside the combustor case into the combustor case and to discharge fuel into the combustion chamber. Each fuel injector of the plurality of fuel injectors includes a nozzle configured to discharge the fuel into the combustion chamber. A fuel-air heat exchanger stem extends radially from the nozzle. The fuel-air heat exchanger stem is coupled to the nozzle and is configured to conduct the fuel to the nozzle along a radially inward direction. The fuel-air heat exchanger stem includes a fuel foil having a fuel passageway coupled fluidically with the nozzle and extending along a first plane that is substantially perpendicular to the radially inward direction. An air foil is positioned adjacent to the fuel foil along the radially inward direction. The air foil has a cooling air passageway that extends along a second plane perpendicular to the radially inward direction to direct air adjacent to the fuel flowing through the fuel passageway.

In some embodiments of the second aspect, the fuel passageway may include a serpentine fuel passageway that extends along the first plane. The cooling air passageway may include a serpentine cooling air passageway that extends along the second plane. The first plane may extend substantially parallel to the second plane.

In some embodiments of the second aspect, the air foil may include a pair of air foils. A first of the pair of air foils may be positioned radially inward of the fuel foil. A second of the pair of air foils may be positioned radially outward of the fuel foil.

In some embodiments, a plurality of fuel foils may be provided. A plurality of air foils may be provided. Each of the plurality of fuel foils may be positioned adjacent to one of the plurality of air foils. The stem may include a fuel inlet manifold for receiving the fuel. A fuel outlet manifold may conduct the fuel to the nozzle. The fuel passageway of each fuel foil may extend between the fuel inlet manifold and the fuel outlet manifold. The fuel inlet manifold and the fuel outlet manifold may each extend in the radially inward direction through each of the plurality of fuel foils and each of the plurality of air foils. Each air foil may include an air opening for receiving the air. The fuel-air heat exchanger stem may include an air outlet manifold for directing the air radially out of the fuel injector. The cooling air passageway of each air foil may extend between the respective air opening and the air outlet manifold. The air outlet manifold may extend in the radially inward direction through each of the plurality of fuel foils and each of the plurality of air foils.

According to a third aspect of the present disclosure, a method of using a fuel injector includes directing a fuel radially into a fuel-air heat exchanger stem of a fuel injector relative to an axis. The method also includes conducting the fuel through a plurality of fuel passageways formed in the fuel-air heat exchanger stem and that each extend axially relative to the axis. The method also includes collecting the fuel from the plurality of fuel passageways and directing the fuel out of the fuel injector through a nozzle. The method also includes conducting air axially into a plurality of cooling air passageways that each extend axially relative to the axis. Each of the plurality of cooling air passageways is located adjacent to one or more of the fuel passages so that heat is transferred between the air and the fuel. The method also includes collecting the air from the plurality of cooling air passageways and directing the air radially out of the fuel injector through the fuel-air heat exchanger stem.

In some embodiments of the third aspect, the method may also include collecting the fuel from the plurality of fuel passageways in a fuel outlet manifold that extends radially through the fuel-air heat exchanger stem. The method may also include conducting the fuel through a plurality of serpentine fuel passageways formed in the fuel-air heat exchanger stem.

These and other features of the present disclosure will become more apparent from the following description of the illustrative embodiments.

BRIEF DESCRIPTION OF THE DRAWINGS

FIG. 8 is a top perspective view of yet another embodiment of one of a plurality of air foils for use with a third fuel injector embodiment, the air foil having a cooling air passageway extending between an air opening and an air outlet manifold;

FIG. 9 is a top perspective view of yet another embodiment of one of a plurality of fuel foils for use with the third fuel injector embodiment, the fuel foil having a fuel passageway extending between a fuel inlet manifold and a fuel outlet manifold;

FIG. 10 is a top perspective view of a further embodiment of one of a plurality of air foils for use with a fourth fuel injector embodiment, the air foil having a cooling air passageway extending between an air opening and an air outlet manifold; and FIG. 11 is a top perspective view of a further embodiment of one of a plurality of fuel foils for the fourth fuel injector embodiment, the fuel foil having a fuel passageway extending between a fuel inlet manifold and a fuel outlet manifold.

DETAILED DESCRIPTION

Figure 1:
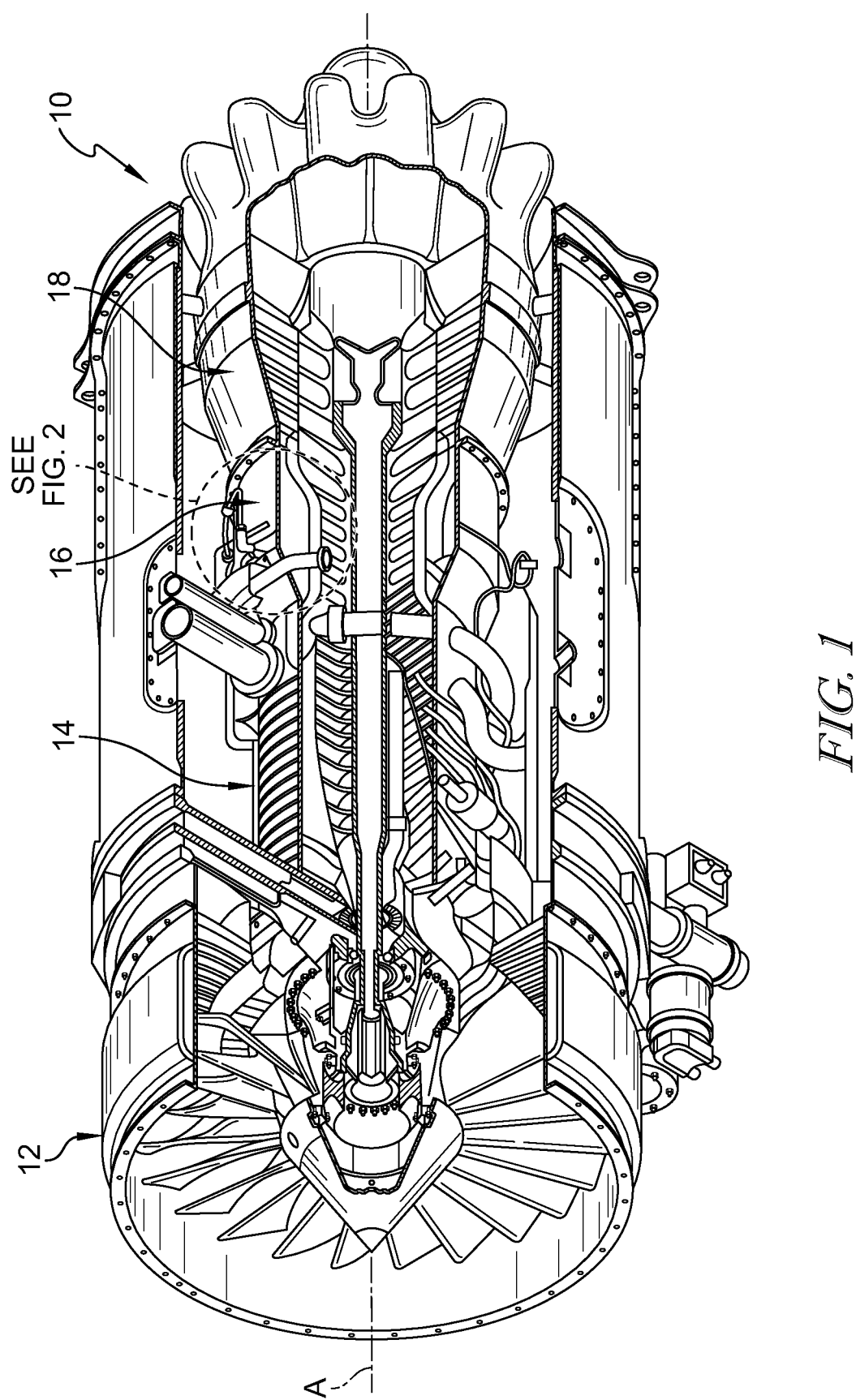
FIG. 1 is a cut-away perspective view of a gas turbine engine showing that the engine includes a fan, a compressor, a combustor, and a turbine, and further showing that the combustor includes a combustor liner defining a combustion chamber and a fuel injector according to the present disclosure for feeding fuel into the combustion chamber as shown in FIG. 2.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12. As used herein, directional references relate to the central axis A of the engine 10.

Figure 2:
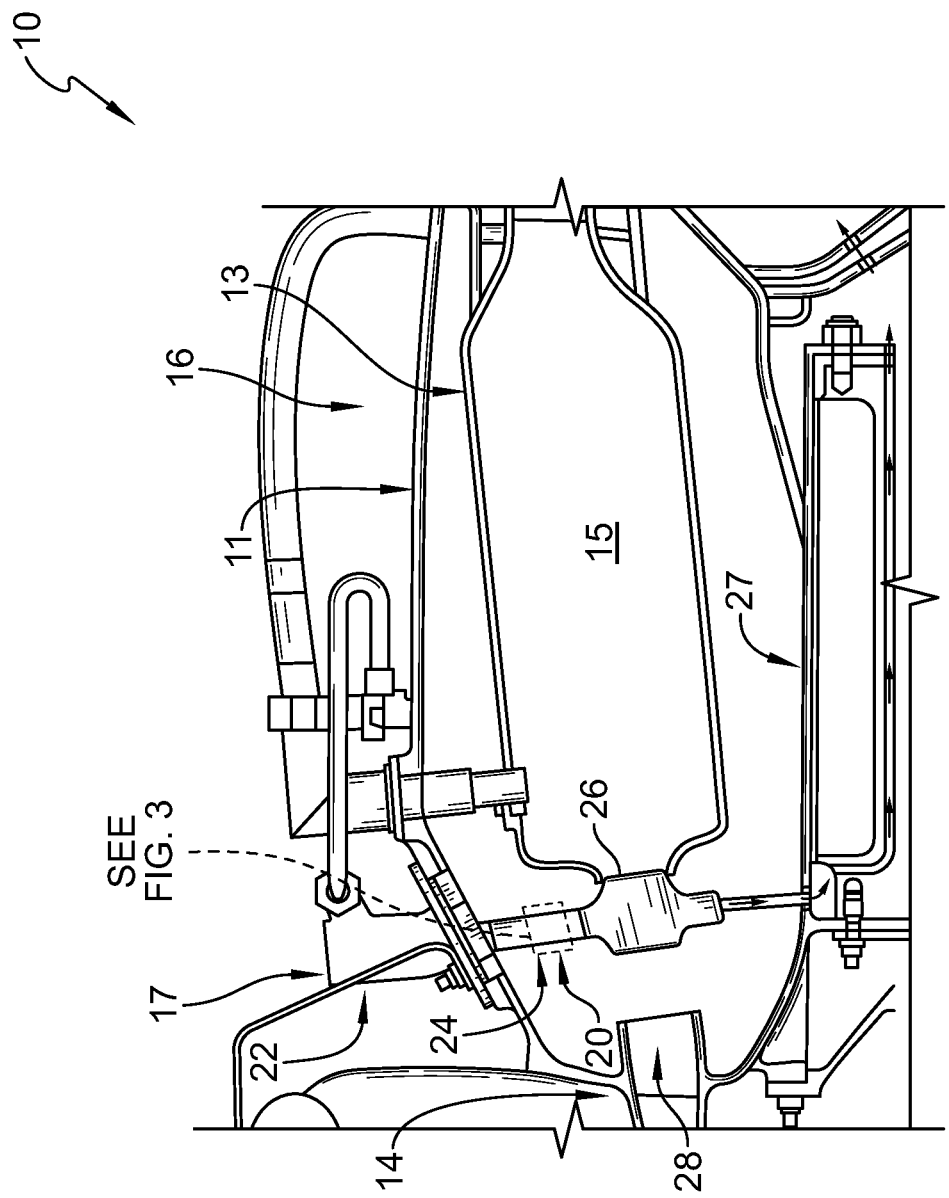
FIG. 2 is a partial sectional view of the gas turbine engine of FIG. 1 showing that the fuel injector is coupled to an outer combustor case aft of the compressor and forward of the combustor and suggesting that air from the compressor is directed through the heat exchanger integrated into the fuel injector to transfer heat to fuel products also flowing through the heat exchanger to produce cooling air for use in cooling components of the turbine.

The combustor 16 includes an outer combustor case 11, a combustion liner 13 defining a combustion chamber 15, and a plurality of circumferentially spaced fuel injectors 17 as shown in FIG. 2. The combustor case 11 defines a high-pressure plenum for blocking escape of high-pressure products flowing within the combustor 16. The fuel injectors 17 are coupled to the combustor case 11 forward of the combustion chamber 15 and are configured to direct fuel products into the combustion chamber 15. In some embodiments, the combustion liner 13 is annular to define an annular combustion chamber 15. In some embodiments, the combustion liner 13 includes a plurality of combustion liners or cans defining a plurality of circumferentially spaced combustion chambers with one or more fuel injectors 17 associated with each combustion chamber.

Each fuel injector 17 includes a connector 22, a stem 24 extending radially inward from the connector 22, and a fuel nozzle 26 coupled to an inner end of the stem 24 as shown in FIG. 2. The connector 22 engages with the combustor case 11 to hold the fuel injector 17 in place and is configured to receive a flow of fuel product. The stem 24 and fuel nozzle 26 extend through the combustor case 11 to align the fuel nozzle 26 with the combustion chamber 15. In the illustrative embodiment, each of the fuel injectors 17 is separately replaceable from adjacent fuel injectors 17.

Figure 3:
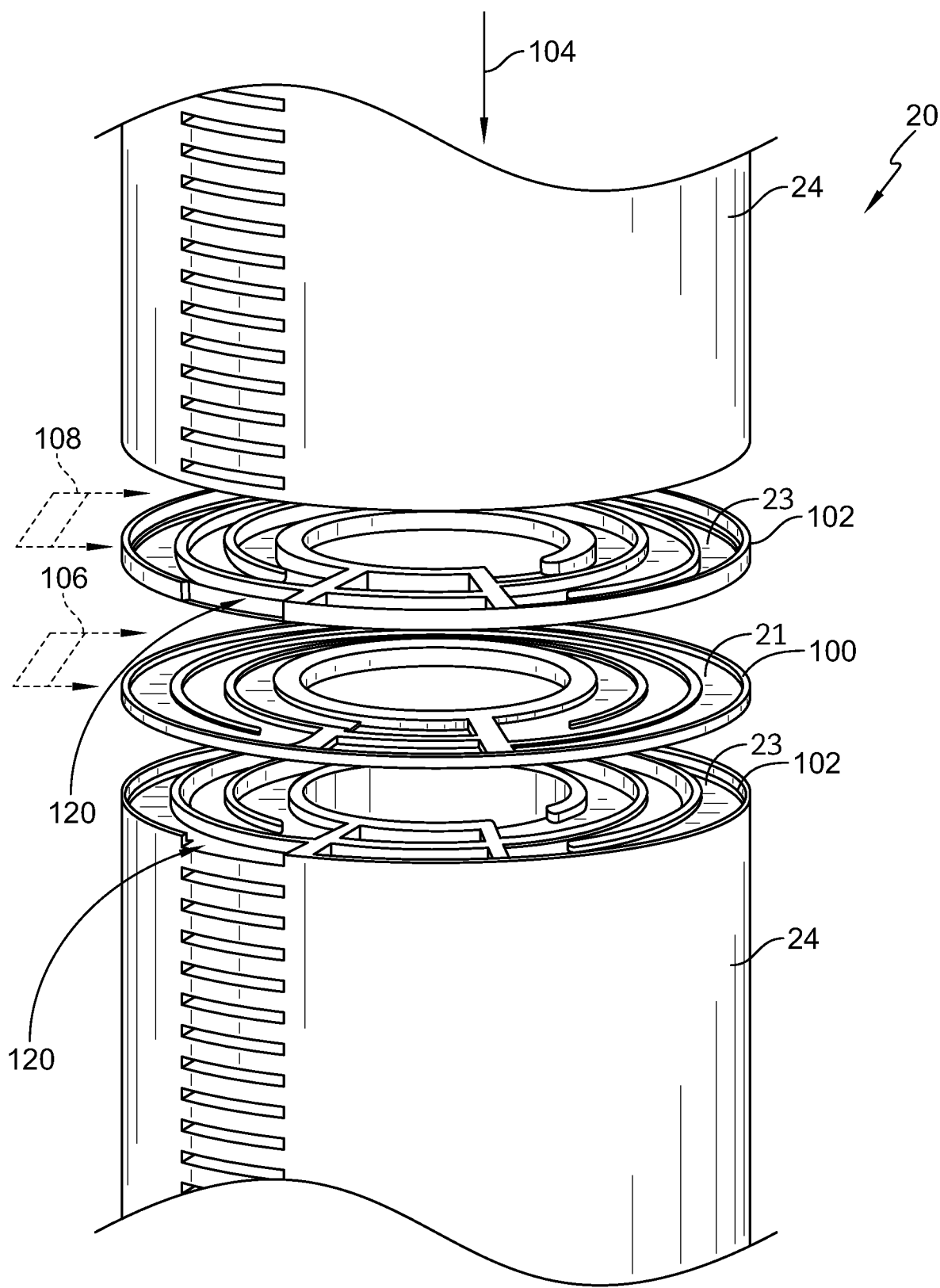
FIG. 3 is a partial exploded view of the fuel injector of FIG. 2 showing a single air foil of a plurality of air foils and a single fuel foil of a plurality of fuel foils and suggesting the alternating air and fuel foils provide the heat exchanger integrated into the fuel injector.

The stem 24 extends radially inward to conduct the fuel to the fuel nozzle 26 and is formed to include an integral fuel-air heat exchanger 20 as suggested in FIGS. 2 and 3. Fuel products enter through the connector 22, flow through a fuel passageway 21 (shown in FIG. 3) of the stem 24 toward the fuel nozzle 26, and exit the fuel nozzle 26 into the combustion chamber 15 to be mixed and ignited with air from the compressor 14. An outlet 28 of the compressor 14 directs the compressed air exiting the compressor 14 around the fuel nozzle 26 and into the combustion chamber 15. In some embodiments, the outlet 28 discharges the compressed air into a diffuser (not shown), from which the compressed air is discharged into the combustor case with a portion of the air being discharged into the fuel-air heat exchanger 20. In the illustrative embodiment, a portion of the air in the high-pressure plenum of the outer combustor case 11 flows into a cooling air passageway 23 (shown in FIG. 3) of the stem 24 to transfer heat to the fuel in the fuel passageway 21 and form cooling air for use in the turbine 18 or other areas of the engine 10 or aircraft.

The fuel passageway 21 and cooling air passageway 23 are fluidically isolated from one another while allowing heat transfer between the fuel products and compressed air flowing therein. In some embodiments, the cooling air is directed through an inner case 27 of the combustor 16. In some embodiments, the cooling air is directed radially outside of the combustor 16.

In the illustrative embodiment, fuel and compressed air flow through the fuel-air heat exchanger 20 in opposite directions as suggested in FIGS. 3-11. Cold fuel enters the fuel passageway 21 adjacent to hot air entering the cooling air passageway 23. Heat is transferred from the air to the fuel as the air and fuel flow through the fuel-air heat exchanger 20. The cooled air exits through the fuel-air heat exchanger 20 while the heated fuel is directed toward the fuel nozzle 26.

Referring to FIG. 3, the fuel-air heat exchanger 20 of the fuel injector 17 includes a plurality of fuel foils 100 and air foils 102 alternatingly stacked on top of one another. For simplicity, FIG. 3. is exploded to show one fuel foil 100 and two air foils 102. The plurality of fuel foils 100 and the plurality of air foils 102 alternate along the stem 24 in a radially-inward direction 104. That is, each fuel foil 100 is positioned adjacent to an air foil 102. In some embodiments, two foils 100, 102 of the same type may be positioned adjacent to one another. Moreover, each air foil 102 is positioned adjacent to a fuel foil 100. Illustratively, the plurality of fuel foils 100 and the plurality of air foils 102 are positioned in the stem 24 in pairs, wherein each pair includes one fuel foil 100 and one air foil 102. As the plurality of fuel foils 100 and the plurality of air foils 102 alternate through the stem 24, a first air foil 102 is positioned radially inward of one of the fuel foils 100, and a second air foil 102 is positioned radially outward of the one of the fuel foils 100. Likewise, a first fuel foil 100 is positioned radially inward of one of the air foils 102, and a second fuel foil 100 is positioned radially outward of the one of the air foils 102.

The plurality of fuel foils 100 and air foils 102 are fixed with one another. In the illustrative embodiment, the foils 100, 102 are diffusion bonded together. In other embodiments, the foils 100, 102 may be coupled and fixed to each other using any other suitable manufacturing process. As a result, air is only allowed to flow into and out of the respective air foil 102 via its air passageway 23 and fuel is only allowed to flow into and out of the respective fuel foil via its fuel passageway 21. As shown in FIG. 3, the stem 24 has a continuous outer surface other than openings 120. The underside of each foil 100, 102 may be flat and continuous for mating with the upper side of the adjacent foil 102, 100.

The fuel passageway 21 extends through each of the fuel foils 100 along a first plane 106 that is substantially perpendicular to the radially-inward direction 104. The cooling air passageway 23 extends through each of the air foils 102 along a second plane 108 that is substantially perpendicular to the radially-inward direction 104 to direct air adjacent to the fuel flowing through the fuel passageway 21 such that heat is transferred from the air flowing through the cooling air passageway 23 to the fuel flowing through the fuel passageway 21. In the illustrative embodiment, the first plane 106 is parallel to the second plane 108.

Figure 4:
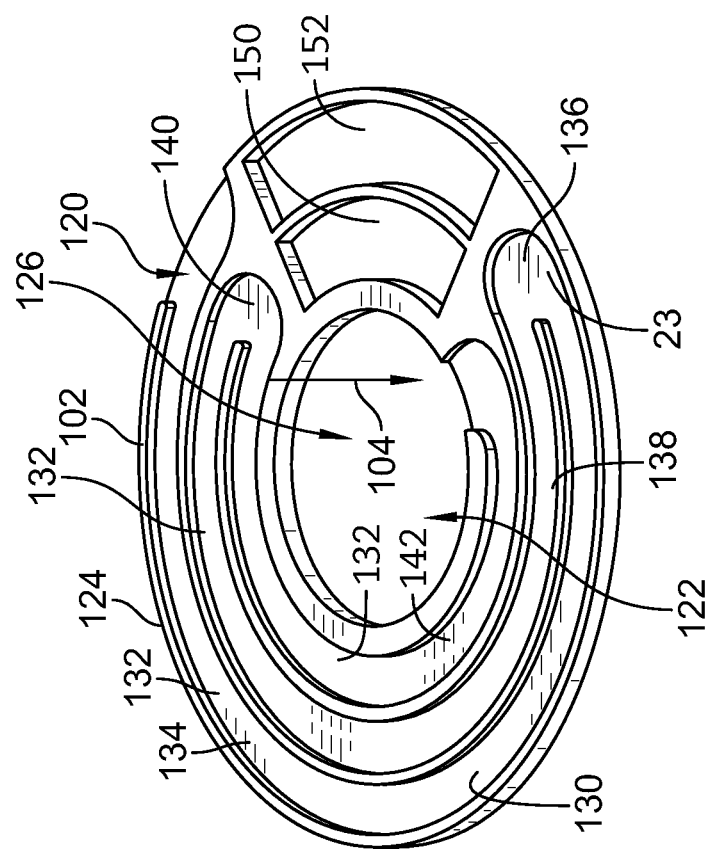
FIG. 4 is a top perspective view of one of the air foils included in the fuel injector of FIG. 3, the air foil having a serpentine cooling air passageway extending between an air opening and an air outlet manifold.

Referring now to FIG. 4, each air foil 102 includes an air opening 120 and an air outlet manifold 122. The air opening 120 of each air foil 102 is formed in an outer surface 124 of the air foil 102, wherein the outer surface 124 forms an outer surface of the stem 24 and is exposed to air upstream of the combustor 16. Each air foil 102 includes its own respective air opening 120. Accordingly, cooling air received, for example, from the compressor 14 discharge, flows into each air foil 102 through the respective air opening 120 from outside of the stem 24. The air outlet manifold 122 extends in the radially-inward direction 104 through the stem 24. The stem 24 includes one air outlet manifold 122 that is in fluid communication with each air foil 102. The air outlet manifold 122 extends through each of the plurality of air foils 102 and each of the plurality of fuel foils 100. The air outlet manifold 122 extends through a center 126 of the stem 24, wherein the center 126 of the stem 24 also forms a center of each of the air foils 102 and each of the fuel foils 100.

The cooling air passageway 23 includes a serpentine cooling air passageway 130 that extends through each air foil 102 along the second plane 108. The serpentine cooling air passageway 130 is in fluid communication with and extends between the respective air opening 120 and the air outlet manifold 122. Accordingly, cooling air enters the respective air opening 120, flows through the serpentine cooling air passageway 130, and exits the air foil 102 through the air outlet manifold 122. Cooling air exits the air outlet manifold 122 and is directed through at least one of the inner case 27 of the combustor 16 and outside of the combustor 16.

The serpentine cooling air passageway 130 includes a plurality of legs 132. In the illustrative embodiment, the serpentine cooling air passageway 130 includes three legs 132; however, the serpentine cooling air passageway 130 may include any number of legs 132. An outer leg 134 extends from the air opening 120 to a first bend 136. The outer leg 134 extends adjacent to the outer surface 124 of the air foil 102. At the first bend 136, the serpentine cooling air passageway 130 turns inward toward the center 126 of the air foil 102. An intermediate leg 138 extends from the first bend 136 to a second bend 140. The intermediate leg 138 extends adjacent to the outer leg 134. At the second bend 140, the serpentine cooling air passageway 130 turns inward toward the center of the air foil 102. An inner leg 142 extends from the second bend 140 to the air outlet manifold 122. The inner leg 142 extends adjacent to the intermediate leg 138 and at least partially around the air outlet manifold 122.

A fuel inlet manifold 150 and a fuel outlet manifold 152 extend through each air foil 102. The fuel inlet manifold 150 and the fuel outlet manifold 152, likewise, extend through each fuel foil 100 so that the fuel inlet manifold 150 and the fuel outlet manifold 152 extend in the radially-inward direction 104 through the stem 24. The fuel inlet manifold 150 and the fuel outlet manifold 152 are not in fluid communication with the cooling air passageway 23. Illustratively, the fuel outlet manifold 152 is positioned adjacent the outer surface 124 of the stem 24, and the fuel inlet manifold 150 is positioned inward of the fuel outlet manifold 152 toward the center 126 of the stem.

Figure 5:
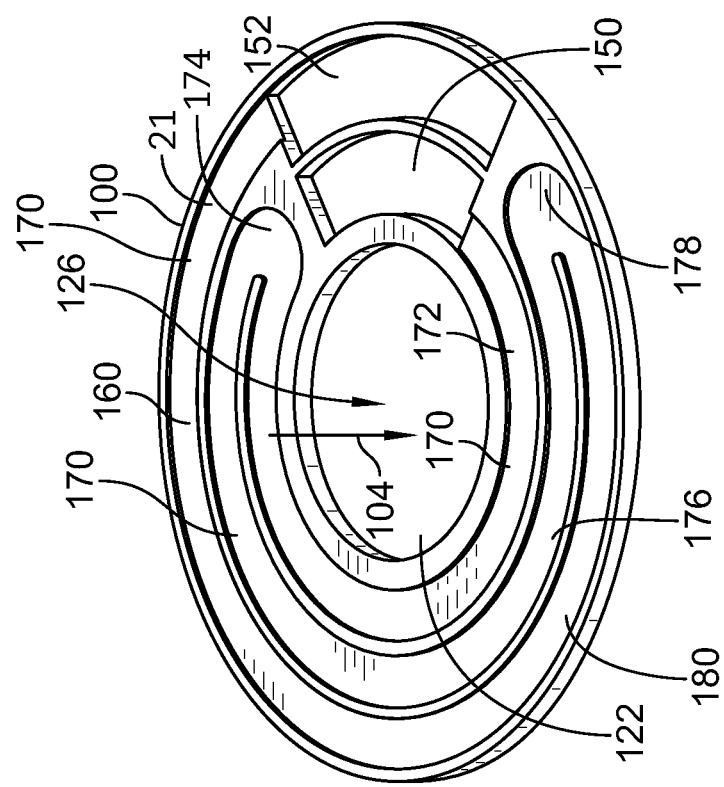
FIG. 5 is a top perspective view of one of the fuel foils included in the fuel injector of FIG. 3, the fuel foil having a serpentine fuel passageway extending between a fuel inlet manifold and a fuel outlet manifold.

Referring to FIG. 5, the fuel inlet manifold 150 and the fuel outlet manifold 152 extend through each of the fuel foils 100. The fuel passageway 21 includes a serpentine fuel passageway 160 that extends along the first plane 106 between the fuel inlet manifold 150 and the fuel outlet manifold 152. Accordingly, fuel enters the fuel foil 100 through the fuel inlet manifold 150, passes through the serpentine fuel passageway 160, and exits the fuel foil 100 at the fuel outlet manifold 152. The serpentine fuel passageway 160 of the fuel foil 100 extends substantially adjacent to the serpentine cooling air passageway 130 of the air foil 102 so that heat is transferred from the air flowing through the cooling air passageway 23 to the fuel flowing through the fuel passageway 21. Notably, the air flowing through the cooling air passageway 23 flows in a substantially opposite direction to the fuel flowing through the fuel passageway 21.

The serpentine fuel passageway 160 includes three legs 170; however, the serpentine fuel passageway 160 may include any number of legs 170. An inner leg 172 extends from the fuel inlet manifold 150 to a first bend 174. The inner leg 172 extends adjacent to and at least partially around the air outlet manifold 122 and also extends substantially adjacent to the inner leg 142 of the serpentine cooling air passageway 130 of the neighboring air foil 102. At the first bend 136, the serpentine fuel passageway 160 turns outward toward the outer surface 124 of the stem 24. An intermediate leg 176 extends from the first bend 174 to a second bend 178. The intermediate leg 176 extends adjacent to the inner leg 172 and substantially adjacent to the intermediate leg 138 of the serpentine cooling air passageway 130 of the neighboring air foil 102. At the second bend 178, the serpentine fuel passageway 160 turns outward toward the outer surface 124 of the stem 24. An outer leg 180 extends from the second bend 178 to the fuel outlet manifold 152. The outer leg 180 extends adjacent to the intermediate leg 176 and the outer surface 124 of the stem 24. The outer leg 180 also extends adjacent to the outer leg 134 of the serpentine cooling air passageway 130 of the neighboring air foil 102.

The air outlet manifold 122 extends through each of the plurality of fuel foils 100 so that the cooling air may pass through the stem 24. The air outlet manifold 122 is not in fluid communication with either of the fuel inlet manifold 150 or the fuel outlet manifold 152. The air outlet manifold also is not in fluid communication with the serpentine fuel passageway 160 of any of the fuel foils 100.

Figure 7:
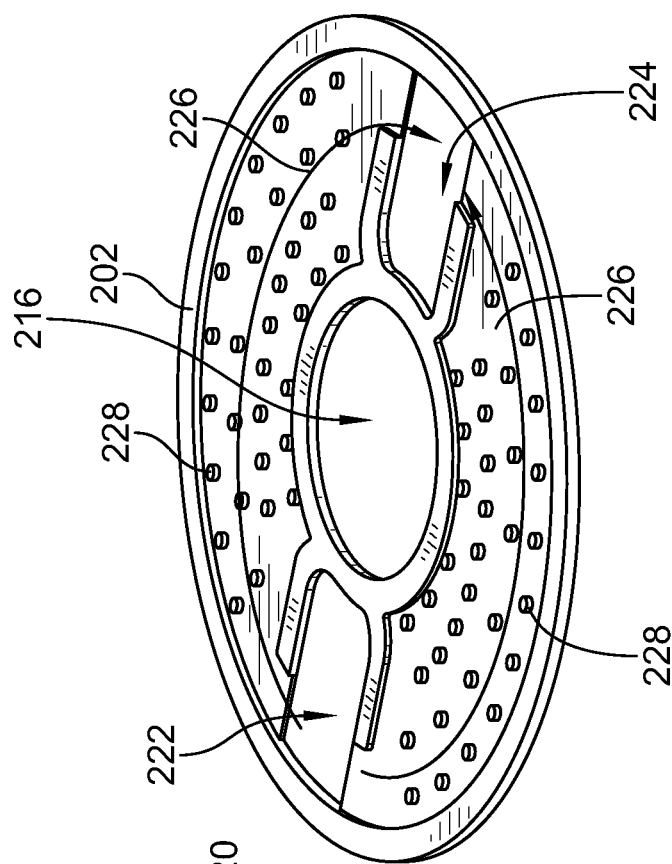
FIG. 7 is a top perspective view of another embodiment of one of a plurality of fuel foils for the second fuel injector embodiment, the fuel foil having a fuel passageway extending between a fuel inlet manifold and a fuel outlet manifold.
Figure 6:
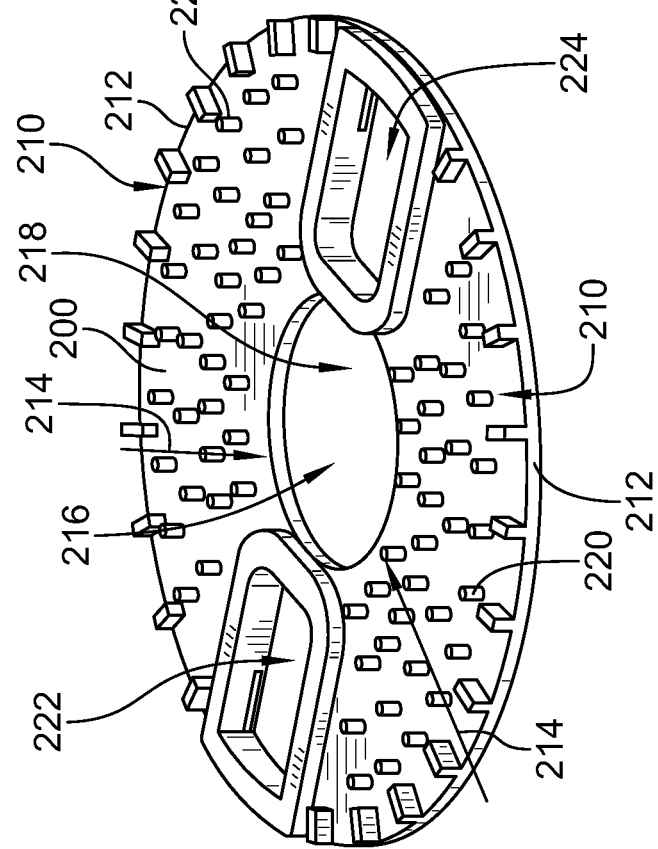
FIG. 6 is a top perspective view of another embodiment of one of a plurality of air foils for a second fuel injector embodiment, the air foil having a cooling air passageway extending between an air opening and an air outlet manifold.

FIGS. 6-7 illustrate another embodiment of an air foil 200 and a fuel foil 202 for use with another embodiment of a fuel-air heat exchanger. The air foil 200 shown in FIG. 6 includes air openings 210 formed along an outer surface 212 of the air foil 200. A cooling air passageway 214 extends between the air openings 210 and an air outlet manifold 216 positioned in a center 218 of the air foil 200. A plurality of pins 220 extend into the cooling air passageway 214 to facilitate heat exchange in the air foil 200.

A fuel inlet manifold 222 and a fuel outlet manifold 224 extend through the air foil 200 and are not in fluid communication with the cooling air passageway 214. As seen in FIG. 7, a fuel passageway 226 extends through the fuel foil 202 between the fuel inlet manifold 222 and the fuel outlet manifold 224. A plurality of pins 228 extend into the fuel passageway 226 to facilitate heat exchange in the fuel foil 202. The air outlet manifold 216 extends through the fuel foil 202 and is not in fluid communication with the fuel passageway 226.

FIGS. 8-9 illustrate yet another embodiment of an air foil 250 and a fuel foil 252 for use with a fuel-air heat exchanger. The air foil 250 shown in FIG. 8 includes air openings 260 formed along an outer surface 262 of the air foil 250. A cooling air passageway 264 extends between the air openings 260 and an air outlet manifold 266 of the air foil 250. A plurality of pins 270 extend into the cooling air passageway 264 to facilitate heat exchange in the air foil 250.

A fuel inlet manifold 272 and a fuel outlet manifold 274 extend through the air foil 250 and are not in fluid communication with the cooling air passageway 264. As seen in FIG. 9, a fuel passageway 276 extends through the fuel foil 252 between the fuel inlet manifold 272 and the fuel outlet manifold 274. A plurality of pins 278 extend into the fuel passageway 276 to facilitate heat exchange in the fuel foil 252. The air outlet manifold 266 extends through the fuel foil 252 and is not in fluid communication with the fuel passageway 276.

FIGS. 10-11 illustrate another embodiment of an air foil 300 and a fuel foil 302 for use with a fuel-air heat exchanger. The air foil 300 shown in FIG. 10 includes air openings 310 formed along an outer surface 312 of the air foil 300. A cooling air passageway 314 extends between the air openings 310 and an air outlet manifold 316 of the air foil 300. A plurality of pins 320 extend into the cooling air passageway 314 to facilitate heat exchange in the air foil 300.

A fuel inlet manifold 322 and a fuel outlet manifold 324 extend through the air foil 300 and are not in fluid communication with the cooling air passageway 314. As seen in FIG. 11, a fuel passageway 326 extends through the fuel foil 302 between the fuel inlet manifold 322 and the fuel outlet manifold 324. A plurality of pins 328 extend into the fuel passageway 326 to facilitate heat exchange in the fuel foil 302. The air outlet manifold 316 extends through the fuel foil 302 and is not in fluid communication with the fuel passageway 326.

Fuel injectors according to the present disclosure can have only 1 type or a combination of each type of the fuel foils 100, 202, 252, 302 and air foils 102, 200, 250, 300. For example, a fuel injector may have one or both types of fuel foils 252, 302 and one or both types of air foils 250, 300. Features of each foil may be incorporated in other foils. For example, pins 320 may be used in any of the foils 100, 102, 200, 202, 250, 252, 300, 352.

The present embodiments provide a cylindrical heat exchanger 20 that enables heat exchange between air and fuel streams, such that packaging can be achieved within the space of a gas turbine fuel injector stem 24. The embodiments promote high effectiveness of heat transfer via microchannels, while presenting modest levels of pressure loss through the two fluid circuits. The embodiments use the volume around the injector arm as available space within which the heat exchanger can be integrated. The heat exchanger includes a repeating pattern of alternating fuel foils 100 and air foils 102, each with a concentric serpentine fluid channel connected to one or more manifolds that run the entire length of the heat exchanger.

A portion of the compressor discharge air, which is already present around the fuel injector, enters the heat exchanger air foil 102, where it flows through the serpentine passages, transferring heat to the fuel channels above and below, before re-combining into a single air stream in the central air outlet manifold. Cold fuel enters the fuel foil 100 of the injector through an annular sector fuel inlet manifold and is distributed among the heat exchanger fuel channel layers. The fuel mirrors the serpentine air channels, with fuel flow opposite to that of the air. This provides a counterflow heat exchange configuration over the entire core, which facilitates improved heat transfer. The fuel is then re-combined into a single heated fuel stream in an annular sector fuel outlet manifold.

The embodiments use an existing route across the gas path to transfer the cooled cooling air to the internal secondary air circuit for performing turbine cooling. Additionally, the modular concept distributes the heat exchange function among all of the engine's injectors and allows for easy replacement of each injector-integrated heat exchanger module.

In some embodiments, each heat exchanger may be fabricated out of metal, such as for example, Inconel 625 using a chemically-etched, laminated foil fabrication technique that includes photo-chemically etching thin sheets of metal, stacking these sheets up, and placing them in a vacuum furnace to diffusion bond the sheets into one solid part that retains approximately >95% of the parent material strength. This enables placement of cooling passages close to the heat exchange surfaces, thereby reducing thermal resistances.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fuel injector for a gas turbine engine, the fuel injector comprising:
   a nozzle configured to discharge a fuel axially relative to an axis of the gas turbine engine into a combustion chamber included in the gas turbine engine,
   a stem that extends radially away from the nozzle and configured to conduct the fuel to the nozzle along a radially inward direction, and
   a fuel-air heat exchanger integral with the stem, the fuel-air heat exchanger including:
   a fuel foil having a fuel passageway coupled fluidly with the nozzle and extending along a first plane that is substantially perpendicular to the radially inward direction, and
   an air foil positioned adjacent to the fuel foil along the radially inward direction, the air foil having a cooling air passageway that extends along a second plane that is substantially perpendicular to the radially inward direction to direct air adjacent to the fuel flowing through the fuel passageway such that heat is transferred from the air flowing through the cooling air passageway to the fuel flowing through the fuel passageway when the fuel injector is used in the gas turbine engine to form cooled air that is directed away from the combustion chamber to provide cooling air.

2. The fuel injector of claim 1, wherein the fuel passageway includes a serpentine fuel passageway that extends along the first plane.

3. The fuel injector of claim 2, wherein the cooling air passageway includes a serpentine cooling air passageway that extends along the second plane.

4. The fuel injector of claim 3, wherein the first plane extends substantially parallel to the second plane.

5. The fuel injector of claim 1, wherein the air foil includes a pair of air foils, wherein:
   a first of the pair of air foils is positioned radially inward of the fuel foil, and
   a second of the pair of air foils is positioned radially outward of the fuel foil.

6. The fuel injector of claim 1, further comprising: a plurality of fuel foils, and
   a plurality of air foils, wherein each of the plurality of fuel foils is positioned adjacent to one of the plurality of air foils.

7. The fuel injector of claim 6, wherein the stem further comprises: a fuel inlet manifold for receiving the fuel; and
   a fuel outlet manifold for conducting the fuel to the nozzle, wherein the fuel passageway of each fuel foil extends between and is fluidly connected with the fuel inlet manifold and the fuel outlet manifold.

8. The fuel injector of claim 7, wherein the fuel inlet manifold and the fuel outlet manifold each extend in the radially inward direction through each of the plurality of fuel foils and each of the plurality of air foils.

9. The fuel injector of claim 7, wherein:
   each air foil further comprises an air opening for receiving the air; and
   the stem further comprises an air outlet manifold for directing the air away from the combustion chamber to provide cooling air,
   wherein the cooling air passageway of each air foil extends between the respective air opening and the air outlet manifold.

10. The fuel injector of claim 9, wherein the air outlet manifold extends in the radially inward direction through each of the plurality of fuel foils and each of the plurality of air foils.

11. The fuel injector of claim 1, wherein:
the fuel foil includes a plurality of first pins positioned in the fuel passageway such that the fuel moving through the fuel passageway flows over the plurality of first pins; and
the air foil includes a plurality of second pins positioned in the cooling air passageway such that the air moving through the cooling air passageway flows over the plurality of second pins.

12. A combustor assembly for use in a gas turbine engine, the combustor assembly comprising:
a combustor case,
a combustion liner mounted in the combustor case to define a combustion chamber, and
a plurality of fuel injectors adapted to conduct fuel from a supply line arranged outside the combustor case into the combustor case and to discharge fuel into the combustion chamber, each fuel injector of the plurality of fuel injectors including:
a nozzle configured to discharge the fuel into the combustion chamber,
a fuel-air heat exchanger stem that extends radially from the nozzle, the fuel-air heat exchanger stem coupled to the nozzle and configured to conduct the fuel to the nozzle along a radially inward direction, and
the fuel-air heat exchanger stem including:
a fuel foil having a fuel passageway coupled fluidly with the nozzle and extending along a first plane that is substantially perpendicular to the radially inward direction, and
an air foil positioned adjacent to the fuel foil along the radially inward direction, the air foil having a cooling air passageway that extends along a
second plane perpendicular to the radially inward direction to direct air adjacent to the fuel flowing through the fuel passageway.

13. The combustor assembly of claim 12, wherein:
the fuel passageway includes a serpentine fuel passageway that extends along the first plane; and
the cooling air passageway includes a serpentine cooling air passageway that extends along the second plane, wherein the first plane extends substantially parallel to the second plane.

14. The combustor assembly of claim 12, wherein the air foil includes a pair of air foils, wherein:
a first of the pair of air foils is positioned radially inward of the fuel foil, and
a second of the pair of air foils is positioned radially outward of the fuel foil.

15. The combustor assembly of claim 12, further comprising: a plurality of fuel foils, and
a plurality of air foils, wherein each of the plurality of fuel foils is positioned adjacent to one of the plurality of air foils.

16. The combustor assembly of claim 15, wherein the stem further comprises:
a fuel inlet manifold for receiving the fuel; and
a fuel outlet manifold for conducting the fuel to the nozzle,
wherein the fuel passageway of each fuel foil extends between the fuel inlet manifold and the fuel outlet manifold, and
wherein the fuel inlet manifold and the fuel outlet manifold each extend in the radially inward direction through each of the plurality of fuel foils and each of the plurality of air foils.

17. The combustor assembly of claim 15, wherein:
each air foil further comprises an air opening for receiving the air; and
the fuel-air heat exchanger stem further comprises an air outlet manifold for directing the air radially out of the fuel injector,
wherein the cooling air passageway of each air foil extends between the respective air opening and the air outlet manifold, and
wherein the air outlet manifold extends in the radially inward direction through each of the plurality of fuel foils and each of the plurality of air foils.

18. A method of using a fuel injector for a gas turbine engine, the method comprising:
directing a fuel radially into a fuel-air heat exchanger stem of a fuel injector relative to an axis, wherein the fuel-air heat exchanger stem extends radially away from a nozzle of the fuel injector,
conducting the fuel through a plurality of fuel passageways formed within respective fuel foils of the fuel-air heat exchanger stem and that each extend axially relative to the axis,
collecting the fuel from the plurality of fuel passageways and directing the fuel out of the fuel injector axially through the nozzle into a combustion chamber of the gas turbine engine,
conducting air axially into a plurality of cooling air passageways within respective air foils that each extend axially relative to the axis, each of the plurality of cooling air passageways located adjacent to one or more of the fuel passages so that heat is transferred between the air and the fuel, and
collecting the air from the plurality of cooling air passageways and directing the air radially out of the fuel injector through the fuel-air heat exchanger stem and away from the combustion chamber.

19. The method of claim 18, further comprising collecting the fuel from the plurality of fuel passageways in a fuel outlet manifold that extends radially through the fuel-air heat exchanger stem.

20. The method of claim 18, further comprising conducting the fuel through a plurality of serpentine fuel passageways formed in the fuel-air heat exchanger stem.

* * * * *